OLE K. NILSSEN
RONALD J. FREIMARK
ROBERT H. PARKER
INVENTORS

BY John R. Faulkner
Glenn S. Arendson
ATTORNEYS

OLE K. NILSSEN
RONALD J. FREIMARK
ROBERT H. PARKER
INVENTORS

BY John R. Faulkner
Glenn S. Arendsen
ATTORNEYS

OLE K. NILSSEN
RONALD J. FREIMARK
ROBERT H. PARKER
INVENTORS
BY John R. Faulkner
Glenn S. Arendsen
ATTORNEYS OLE K. NILSSEN
RONALD J. FREIMARK
ROBERT H. PARKER
INVENTORS
BY John K. Faulkner
Glenn S. Arendsen
ATTORNEYS

OLE K. NILSSEN
RONALD J. FREIMARK
ROBERT H. PARKER
INVENTORS

BY John R. Faulkner
Glenn S. Arendsen
ATTORNEYS

United States Patent Office 3,518,586

Patented June 30, 1970

3,518,586

ELECTRONIC TUNING DEVICE UTILIZING BINARY COUNTERS AND MEMORY SYSTEM

Ole K. Nilssen, Bensenville, Ill., and Ronald J. Freimark, Allen Park, and Robert H. Parker, Farmington, Mich., assignors to Ford Motor Company, Dearborn, Mich., a corporation of Delaware Filed June 17, 1968, Ser. No. 737,763

Int. Cl. H03j *5/32*

U.S. Cl. 334—7 13 Claims

ABSTRACT OF THE DISCLOSURE

Increments of capacitance are switched into and out of the resonant circuits of a radio according to the states of binary counters and thereby determine the tuned frequency of the radio. The counters are coupled to a pulse generator controlled by the radio manual tuning knob and add or subtract the pulses received therefrom depending on the direction the knob is turned. A memory system is actuated by the radio push buttons to switch the increments of capacitance according to the states of storage elements. In place of the increments of capicitance, the capacitance of hyper-abrupt junction diodes is continuously varied by a voltage analogous to the binary sense of the counters.

SUMMARY OF THE INVENTION

Virtually all continuously tunable type radios tune to varying frequencies by mechanically rotating tuning capacitors or reciprocating tuning slugs in inductors. Many of these radios, particularly those used in automotive vehicles, also have manually operable push buttons that can be set to preselected stations and will tune the radio to that station when the push button is actuated. In the past, these push buttons tuned the radio by mechanically positioning a plurality of the tuning slugs in appropriate inductors and the manual tuning knob was geared to a mechanism for moving the same tuning slugs.

In the older radios employing vacuum tubes as amplifying stages, the physical size of the manual tuning mechanisms occupied a relatively small proportion of the entire radio package. The less bulky amplifying circuitry provided initially by the transistor and more recently by integrated circuitry, however, has rendered the mechanical station selecting mechanisms associated with push buttons and manual tuning knobs by far the largest component of the radio. Reducing the size of instrument packages for automobile instrument panels has always been a desirable objective, and recently proposed safety standards specifying the impact cushioning in vehicle interiors have added tremendous impetus to this objective.

This invention provides a device for tuning a radio in response to a manually rotatable tuning knob and push buttons preset to selected frequencies that is capable of miniaturization along with the other radio components. In a radio used in sending or receiving modulated electromagnetic carrier waves of varying frequencies and having a resonant circuit for tuning to a carrier wave frequency, the device comprises a variable reactance that can be in the form of incremental capacitors, inductors, or resistors connected for coupling into and out of the resonant circuit. Each incremental unit has a switch associated therewith to effect the coupling and uncoupling, with the switches controlled by pulse counters. A pulse generator controlled by the manually operable tuning knob is coupled to the pulse counters. When a different station is desired, the tuning knob is rotated to begin pulse generation. These pulses and a sense signal are fed to the pulse counters which close or open the appropriate switches to couple or uncouple appropriate incremental capacitors and thereby vary the resonant frequency until the radio is tuned to the new station.

Also coupled to the pulse counters and the switches associated with each incremental unit is a memory system for storing the states of the pulse counters and for operating the switches accordingly. The radio push buttons actuate the memory system, which includes a remember circuit for storing the states of the pulse counters when the radio is tuned to any desired frequency in a memory. Subsequent operation of a radio push button actuates the switches according to the stored states and thereby tunes the radio to that frequency.

The tuning device of this invention can be used in any mechanism for the transmission of electromagnetic carrier waves such as standard broadcasting AM and FM radios, transmitters, transreceivers, television sets, and aircraft and watercraft communication and navigation sets. As used in this application, the phrase "transmission of electromagnetic carrier waves" is intended to include both sending and receiving equipment. The size reducing advantage of the tuning device is most realizable in portable and transportation equipment although this advantage combined with tuning accurracy and ease renders the device attractive in any installation on either end of the transmission process.

DETAILED DESCRIPTION

Figure 1:
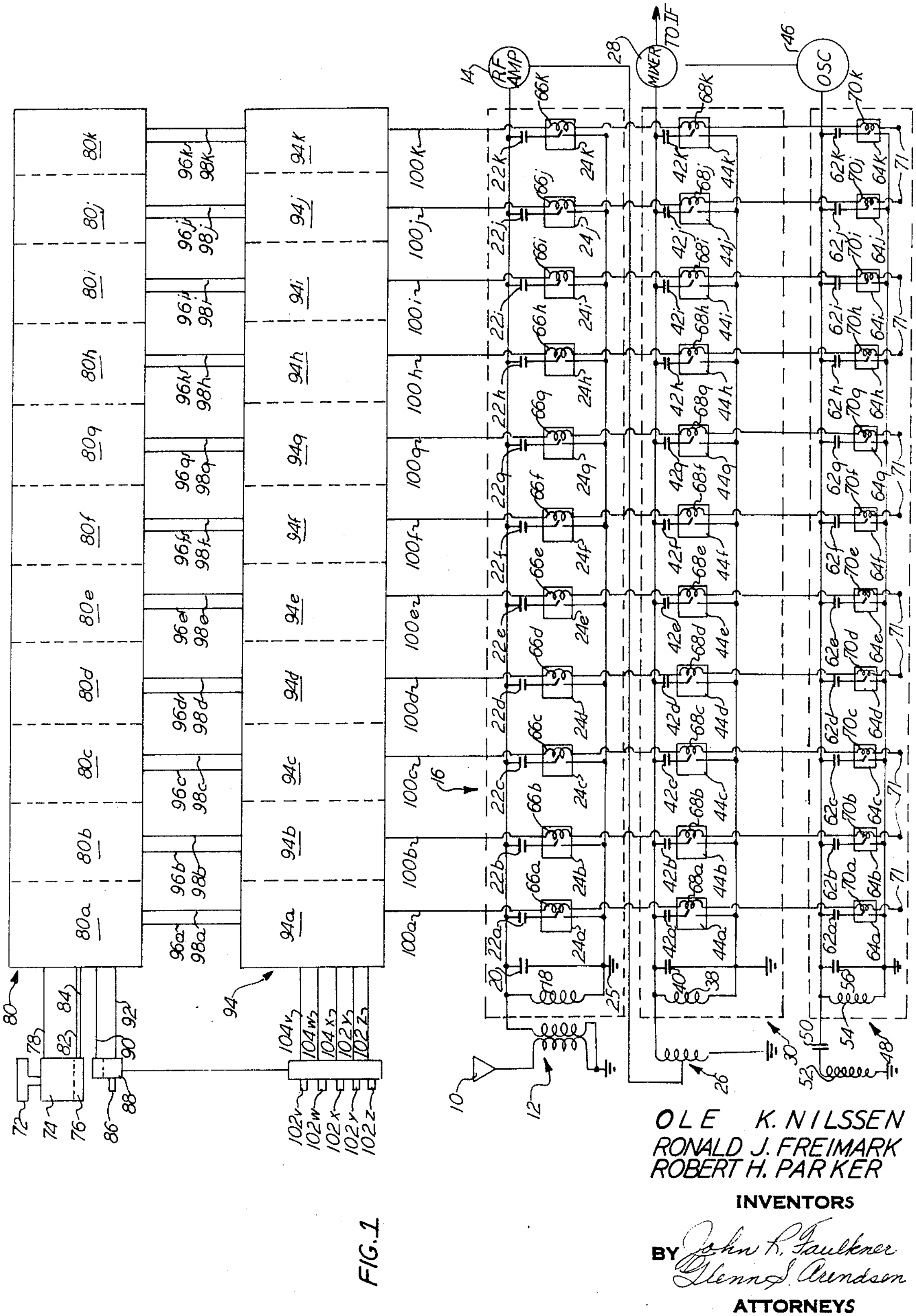
FIG. 1 is a block diagram of the tuning device of this invention showing the device connected to the tunable circuits of a superheterodyne radio receiver.

Referring to FIG. 1, the radio antenna 10 is connected through an input transformer 12 to an RF amplifier stage 14 having a tunable tank circuit enclosed by dashed line 16. Tank circuit 16 comprises a fixed inductor 18 in parallel with a fixed capacitor 20 plus eleven incremental capacitors 22*a*, 22*b*, 22*c* . . . 22*k*. Each incremental capacitor is in series with a switch represented by boxes 24*a*, 24*b*, 24*c* . . . 24*k*. The tank circuit is connected to ground at 25.

The output from RF amplifier stage 14 is coupled through an input transformer 26 to a mixer stage 28 having a tunable tank circuit enclosed by dashed line 30. Tank circuit 30 comprises a fixed inductance 38 in parallel with a fixed capacitance 40 plus eleven incremental capacitors 42*a*, 42*b*, 42*c* . . . 42*k*. Each of the latter group of incremental capacitors is in series with a switch represented by boxes 44*a*, 44*b*, 44*c* . . . 44*k*.

A local oscillator 46 has its output coupled to a mixer stage 28. The frequency of oscillator 46 is determined by a tunable tank circuit enclosed by dashed line 48 that is coupled to ground through a capacitor 50 in series with an inductor 52. Tank circuit 48 comprises a fixed inductor 54 in parallel with a fixed capacitor 56 plus an additional eleven incremental capacitors 62*a*, 62*b*, 62*c* . . . 62*k*. Each of incremental capacitors 62 is in series with a switch represented by boxes 64*a*, 64*b*, 64*c* . . . 64*k*. The output of mixer stage 28 is coupled to conventional IF stages (not shown) and the subsequent stages of radio, all of which operate in the conventional manner.

Tank circuits 16, 30 and 48 are designed so they tune the associated stage to the proper frequency when corresponding incremental capacitors are in the respective tank circuit. Thus, when all of the switches associated with the incremental capacitors are open, the tank circuits are tuned to convert a certain input frequency appearing at the antenna into the constant IF frequency; when incremental capacitors 22*a*, 42*a*, and 62*a* are in the respective tank circuits, the tank circuits convert another input frequency into the same IF frequency, etc.

Each switch associated with an incremental capacitor is a reed relay with the operating coils in switches 24*a* to 24*k* represented by numerals 66*a*, 66*b*, 66*c* . . . 66*k*, respectively, the operating coils in switches 44*a* to 44*k* represented by numerals 68*a* to 68*k*, and the operating coils in switches 64*a* to 64*k* represented by numerals 70*a* to 70*k*. Coils 66*a*, 68*a* and 70*a* are in series with each other, coils 66*b*, 68*b* and 70*b* are in series with each other, etc. The open side of each coil 70 is connected to a voltage source at point 71.

Turning now to the block diagram portion of FIG. 1, a tuning knob 72 is connected to an oscillator 74 that has a sense control 76 associated therewith. A lead 78 connects oscillator 74 with a pulse counter represented generally by the numeral 80 and two leads 82 and 84 connect sense control 76 with pulse counter 80. Pulse counter 80 is made up of eleven binary counters designated by 80*a*, 80*b*, 80*c* . . . 80*k*, with each binary counter corresponding to the series of switches in the tank circuits having the same suffix letter (e.g., counter 80*a* corresponds to switches 24*a*, 44*a*, 64*a*; counter 80*b* corresponds to switches 24*b*, 44*b*, 64*b*). A preset button 86 associated with a preset amplifier represented by 88 is connected to pulse counter 80 by leads 90 and 92.

A memory 94 is made up of eleven sections 94*a*, 94*b*, 94*c* . . . 94*k*. Each section of memory 94 is connected to the corresponding binary counter in pulse counter 80 by respective leads 96*a*, 96*b*, 96*c* . . . 96*k* and 98*a*, 98*b*, 98*c* . . . 98*k*, and to the open side of the corresponding coil 66 by a lead 100*a*, 100*b*, 100*c* . . . 100*k*, with the corresponding components having the same suffix letter. Five push buttons 102*v*, 102*w*, 102*x*, 102*y*, 102*z* are connected to memory 94 by leads 104 *v*, 104*w* . . . 104*z*.

Figure 2:
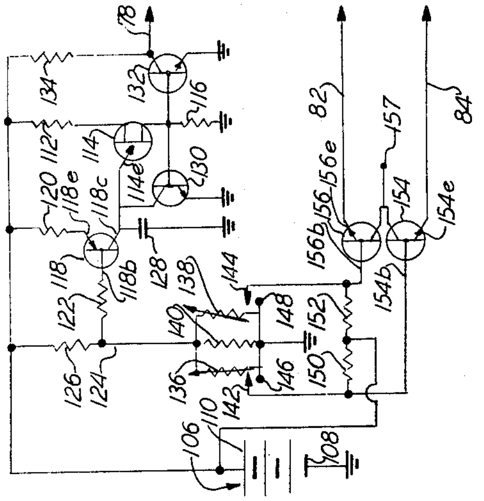
FIG. 2 is a circuit diagram of a typical pulse generator useful in the tuning device.

The circuits of oscillator 74 and sense control 76 are shown in FIG. 2. A battery 106 has its negative terminal 108 connected to ground and its positive terminal 110 connected through a resistor 112 to base 2 of a unijunction transistor 114. Base 1 of unijunction transistor 114 is connected through a resistor 116 to negative terminal 108 as indicated by its connection to ground.

A PNP type transistor 118 has its emitter 118*e* connected through a resistor 120 to positive terminal 110 of the battery and its collector 118*c* connected to the emitter 114*e* of unijunction transistor 114. Transistor base 118*b* is connected through a resistor 122 to a lead 124 that has one end connected through a resistor 126 to positive terminal 110. A capacitor 128 in parallel with the collector-emitter terminals of an NPN transistor 130 connects collector 118*c* to ground, with collector 118*c* being connected to the collector of transistor 130. Another NPN transistor 132 has its collector connected to the positive terminal 110 through a resistor 134 and its emitter connected to ground. The bases of transistors 130 and 132 are connected to base 1 of the unijunction transistor 114. Lead 78 (FIG. 1) is connected to the collector of transistor 132.

The other end of lead 124 is connected to ground through a parallel arrangement of two pressure sensitive resistors 136 and 138 and a fixed resistor 140. Associated with each pressure sensitive resistor is a pole 142, 144 movable to grounded contacts 146, 148, respectively, but normally out of touch therewith. Pole 142 is connected to positive terminal 110 through a resistor 150, and pole 144 similarly is connected to positive terminal 110 through a resistor 152. In addition, pole 142 is connected to the base 154*b* of an NPN type transistor 154, and pole 144 is connected to the base 156*b* of an NPN type transistor 156. The collectors of transistors 154 and 156 are connected to the positive potential of a predetermined value at point 157. Emitter 154*e* is connected to lead 84 and emitter 156*e* is connected to lead 82.

Transistors 114, 118, 130 and 132, resistors 136 and 138 and interconnecting circuitry make up the oscillator 74. Poles 142 and 144, transistors 154 and 156 and interconnecting circuitry make up the sense control 76.

Typical values or types of the FIG. 2 components useful with a 12 volt battery and about 3.7 volts at point 157 are: resistor 112, 330 ohms; unijunction transistor 114, 2N1671; resistor 116, 180 ohms; transistor 118, 2N3638; resistor 120, 180 ohms; resistor 122, 1K ohms; resistor 126, 200 ohms; capacitor 128, 2 microfarads; transistors 130 and 132, type 2N3053; resistor 134, 4.7K; resistors 136 and 138, 2–15K; resistor 140, 6.8K; resistors 150 and 152, 10K; and transistors 154 and 156, type 2N3053.

Figure 3:
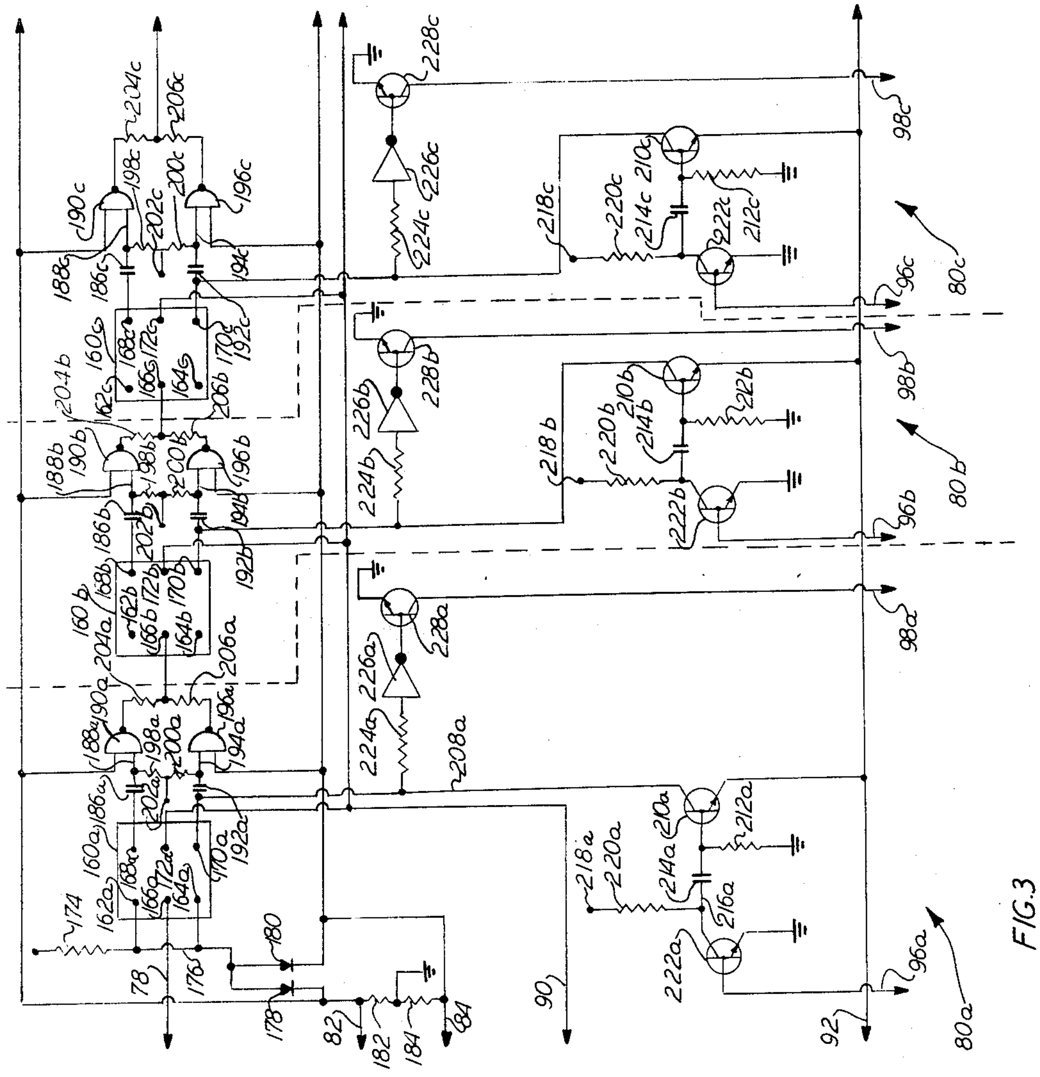
FIG. 3 is a circuit diagram of the pulse counter showing three binary counters with appropriate gating and also showing a portion of the remember circuitry.

FIG. 3 shows only three binary counters 80*a*, 80*b* and 80*c* of the eleven counters in pulse counter 80 since the other counters are duplicates. The counters in FIG. 3 are separated by dotted lines. Each counter comprises a JK type flip flop 160*a*, 160*b*, 160*c*. Taking flip flop 160*a* as an example, the flip flop has a set pin 162*a*, a reset pin 164*a*, a clock pulse (CP) pin 166*a*, a Q pin 168*a*, a $\overline{Q}$ pin 170*a*, and a preset pin 172*a*. Corresponding pins on the other flip flops are numbered accordingly with suffix letters designating the flip flop.

Lead 78 from the pulse generator described in FIG. 2 is connected to CP pin 166*a*. A source of voltage is applied at one end of a resistor 174 which is connected to a lead 176. Lead 176 is connected to set pin 162*a* and reset pin 164*a* and to the anodes of two diodes 178 and 180. The cathode of diode 178 is connected to lead 82 and the cathode of diode 180 is connected to lead 84. Resistors 182 and 184 connect respective leads 82 and 84 to ground.

Q pin 168*a* is coupled through a capacitor 186*a* to one input 188*a* of a NAND gate 190*a*. Similarly, $\overline{Q}$ pin 170*a* is coupled through a capacitor 192*a* to one input 194*a* of a second NAND gate 196*a*. Resistors 198*a* and 200*a* couple inputs 188*a* and 194*a* to a voltage source 202*a*. Each NAND gate 190 and 196 has two inputs with the other input of NAND gate 190*a* coupled to lead 82 and the other input of NAND gate 196*a* coupled to lead 84. Resistors 204*a* and 206*a* couple the outputs of NAND gates 190*a* and 196*a* to the CP pin 166*b* of the flip flop 160*b* in the next binary counter 80*b*.

A lead 208*a* connects $\overline{Q}$ pin 170*a* to the collector of an NPN transistor 210*a*. The emitter of transistor 210*a* is connected to lead 92 (FIG. 1). A resistor 212*a* connects the base of transistor 210*a* to ground and a capacitor 214*a* connects the base to a lead 216*a*. Lead 216*a* is connected to a voltage source 218*a* through a resistor 220*a* and also is connected to the collector of another NPN transistor 222*a*. The emitter of transistor 222*a* is connected to ground and the base is connected to lead 96*a* (FIG. 1).

A resistor 224*a* connects lead 208*a* through an amplifier-inverter represented by 226*a* to the base of an NPN transistor 228*a*. The emitter of transistor 228*a* is connected to ground and the collector is connected to lead 98*a* (FIG. 1).

Counters 80*b* and 80*c*, etc., are constructed similarly except the set and reset terminals of the flip flops are grounded by leads not shown. The last flip flop 80*k*, of course, does not have NAND gates coupled to its Q and $\overline{Q}$ pins.

Typical types and values of components used in the FIG. 3 construction are flip flops 160, Fairchild RTμL 9923 micrologic integrated circuits; diodes 178 and 180, 2N4001; resistors 182 and 184; 4.7K ohms; capacitors 186 and 192, 500 picofarads; NAND gates 190 and 196, Fairchild RTμL 9914; resistors 198 and 200, 4.7K; resistors 204 and 206, 1K; transistors 210 and 222, type 2N4124; resistors 212, 68K; capacitors 214, 150 microfarads; resistors 220, 4.7K; resistors 224, 680 ohms; amplifier-inverters 226, RTμL 9900; and transistors 228, type 2N3053. A positive potential of approximately 3.7 volts is applied to the top of resistor 174, points 202, and points 218.

Figure 4:
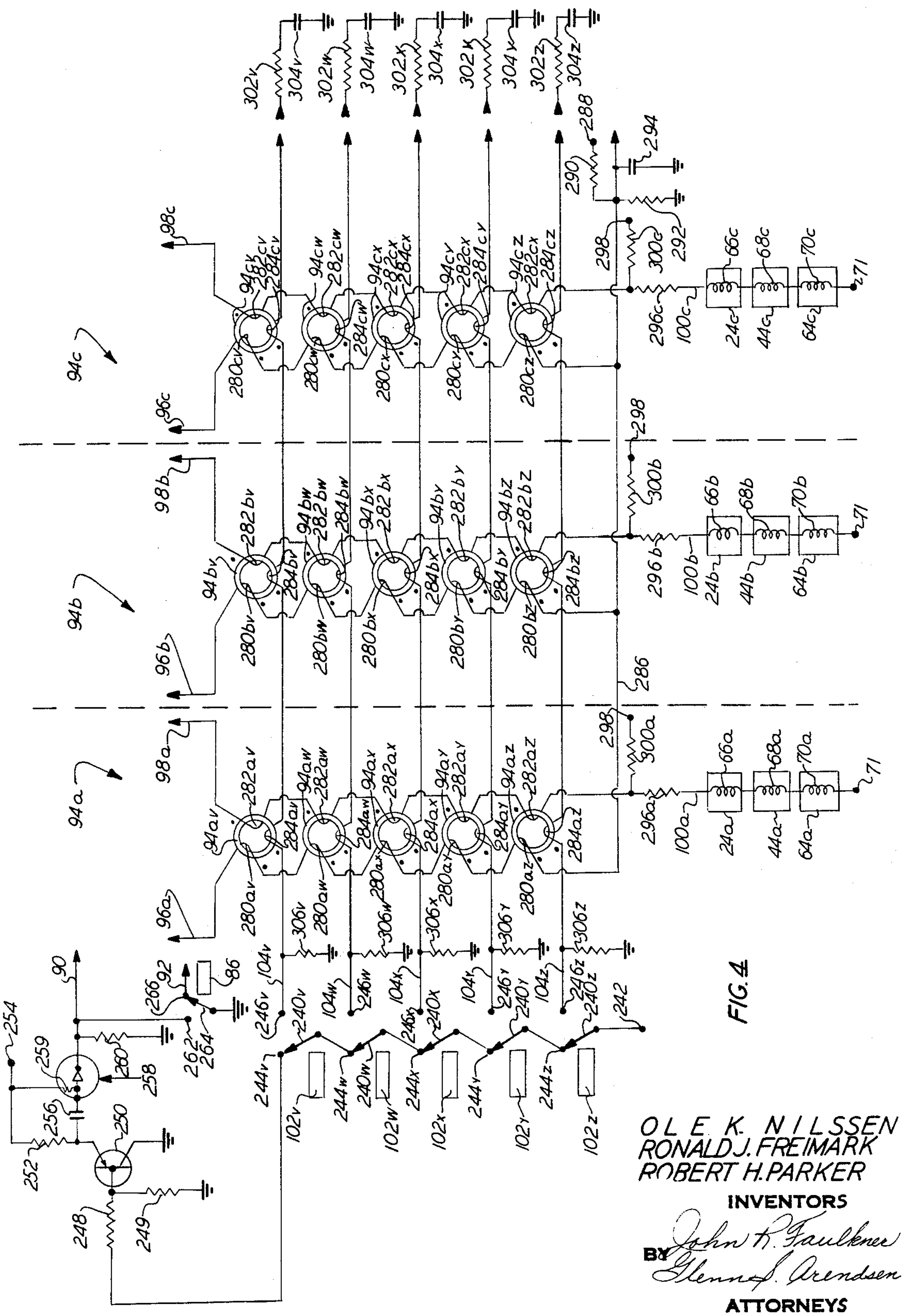
FIG. 4 is a circuit diagram of the preset amplifier used in the remember circuitry and the memory circuit showing the memory elements, station selecting push buttons and the operating coils of the switches for the incremental capacitors.

Three sections 94a, 94*b*, and 94*c* of memory 94 along with the five push buttons 102 and the circuitry of preset amplifier 88 are shown in FIG. 4. Each of push buttons 102 acts on a switch pole 240*v*, 240*w*, 240*x*, 240*y* and 240*z*, respectively. Pole 240*z* is connected to a voltage source at point 242 and is movable from a contact 244*z* to a contact 246*z*. Contact 244*z* is connected to pole 240*y* which is movable between contacts 244*y* and 246*y*. In similar fashion, contact 244*y* is connected to pole 240*x* which is movable between contacts 244*x* and 246*x*; contact 244*x* is connected to pole 240*w* which is movable between contacts 244*w* and 246*w*; and contact 244*w* is connected to pole 240*v* which is movable between contacts 244*v* and 246*v*.

Contacts 246*v, w, x, y* and *z* are connected to leads 104*v, w, x, y* and *z* (FIG. 1), respectively. Poles 240 are normally in touch with appropriate contacts 244 but are moved to contacts 246 upon actuation of the appropriate push button 102.

A resistor 248 connects contact 244*v* to the base of a PNP transistor 250, and a resistor 249 connects the base to ground. The collector of transistor 250 is connected to ground and the emitter is connected through a resistor 252 to a voltage source at point 254. In addition, a capacitor 256 couples couples the emitter to an amplifier-inverter indicated generally by numeral 258. Amplifier 258 contains an internal resistor 259 connected to point 254.

Lead 90 (FIG. 1) is connected to the output of amplifier 258. A resistor 260 connects lead 90 to ground and the lead also is connected to a contact 262. A grounded switch pole 264 is normally in touch with a contact 266 connected to lead 92 (FIG. 1) but is moved into touch with contact 262 when actuated by preset push button 86. Transistors 210, 222 and 250, amplifier 258, pole 264 and the interconnecting circuitry make up the remember circuit.

Each section of the memory consists of five ferromagnetic cores with cores 94*av*, 94*aw*, 94*ax*, 94*ay* and 94*az* in section 94; cores 94*bv*, 94*bw*, 94*bx*, 94*by* and 94*bz* in section 94*b*; etc. Each core contains a read winding 280, a write winding 282, and a clear winding 284 with the read winding on core 94*av* designated 280*av*, the write winding 282*av*, and the clear winding 284*av*; the read winding on core 94*aw* designated 280*aw*, the write winding 282*aw*, and the clear winding 284*aw*; etc. The dot convention is used in FIG. 4 to designate the relative connections of the read, write and clear windings.

Read windings 280*av, w, x, y, z* are connected in series and connect lead 96*a* to a lead 286. Similarly, read windings 280*bv, w, x, y, z* are connected in series and connect lead 96*b* to lead 286; read windings 280*cv, w, x, y, z* are connected in series and connect lead 96*c* to lead 286; etc. Lead 286 is connected through a resistor 290 to a positive voltage source at point 288 and through a resistor 292 in parallel with a capacitor 294 to ground.

Write windings 282*av, w, x, y, z* are connected in series with each other and connect lead 98*a* through a resistor 296*a* to lead 100*a* (FIG. 1). A voltage source represented by point 298 is connected to the top of resistor 296*a* through a resistor 300*a*. Similarly, write windings 282*bv, w, x, y, z* are connected in series and connect lead 98*b* to the top of a resistor 296*b* that is connected to lead 100*b*, with resistor 300*b* connecting the voltage source 298 to the top of resistor 296*b*. In a similar manner, write windings 282 in section 94*c* connect lead 98*c* through appropriate resistors 296*c* and 300*c* to lead 100*c* and voltage source 298; etc.

Clear windings 284*av*, 284*bv*, 284*cv* . . . 284*kv* are connected in series with each other and connect lead 104*v* to a resistor 302*v*. A capacitor 304*v* connects resistor 302*v* to ground. Similarly, clear windings 284*aw*, 284*bw*, 284*cw* . . . 284*kw* connect lead 104*w* through a resistor 302*w* and a capacitor 304*w* to ground; clear windings 284*ax*, 284*bx*, 284*cx* . . . 284*kx* are connected in series and connect lead 104*x* through resistors 302*x* and capacitor 304*x* to ground; etc. At the left side of the memory, resistors 306*v, w, x, y* and *z* connect respective contact 246*v, w, x, y* and *z* to ground.

With positive potentials of 12 volts at points 71, 242 and 298 and 3.7 volts at points 254 and 288, typical values and types of the components used in FIG. 4 are resistor 248, 4.7K resistor 249, 1K; transistor 250, 2N4126; resistor 252 100K; capacitor 256, .05 microfarad; amplifier 258, Fairchild RTμL 9900; resistor 260, 68 ohms; cores 94, Indiana General ML 140; resistor 290, 8.2K; resistor 292, 5.6K; capacitor 294, 0.22 microfarad; resistors 296, 40 ohms; resistors 300, 125 ohms; resistors 302, 15 ohms; capacitors 304, 10 microfarads; and resistors 306, 68 ohms.

OPERATION OF FIGS. 2–5

Figure 5:
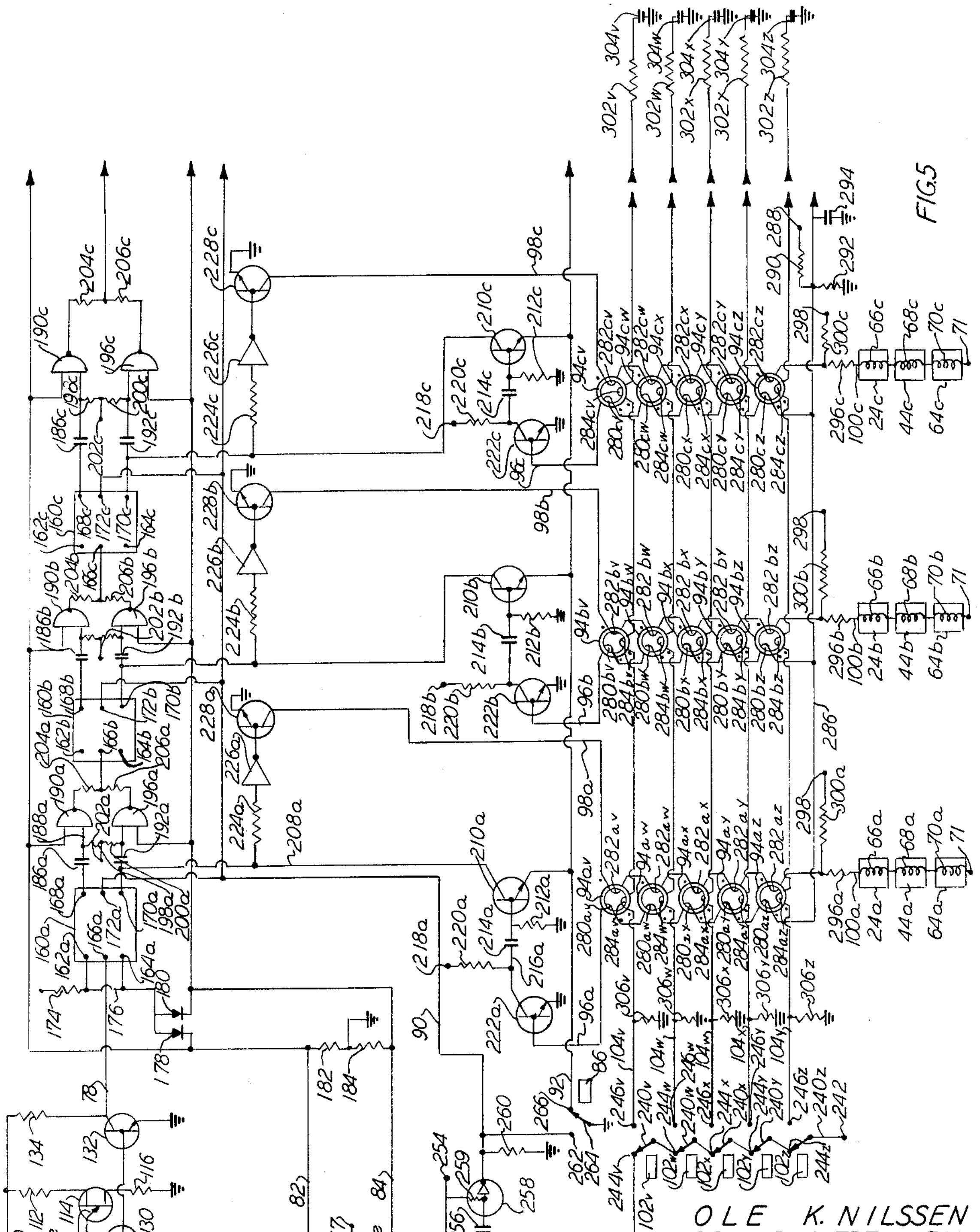
FIG. 5 is a circuit diagram of the entire tuning device showing the interconnections between the various portions shown in FIGS. 2–4.

FIG. 5 shows the interconected circuits of FIGS. 2–4 and should be used to understand the portions of the following discussion where the interconnected operation is described.

Referring to FIGS. 1 and 2, turning tuning knob 72 in one direction decreases the resistance of variable resistor 136 and moves pole 142 into touch with contact 146, while turning the tuning knob in the opposite direction decreases the resistance of resistor 138 moves pole 144 into touch with contact 148. Spring loading on the tuning knob returns the knob to its neutral position whenever the turning force is removed. When the tuning knob is in its neutral position, transistor 118 is reverse biased so emitter 114*e* stays substantially at ground potential and no pulses are produced. When the tuning knob is turned in either direction, the reduced resistance of resistors 136 or 138 reduces the potential at base 118*b* to forward bias transistor 118. Capacitor 128 begins charging and the potential of emitter 114*e* of the unijunction transistor begins rising to its peak point.

Unijunction transistor 114*e* breaks into conduction when the potential at emitter 114*e* reaches the peak point. The potential at the bases of transistors 130 and 132 then increases and transistors 130 and 132 break into conduction. Transistor 130 discharges capacitor 128 rapidly and efficiently while transistor 132 decreases the potential at lead 78. When capacitor 128 is discharged, unijunction transistor 114 again becomes non-conducting, thereby turning off transistors 130 and 132. The potential at lead 78 increases substantially to supply voltage so a pulse has been produced in lead 78.

Assuming that tuning knob 72 was turned in the direction actuating resistor 136, pole 142 is moved into touch with contact 146 thereby grounding base **154*b* of transistor 154. With the positive potential of about 3.7 volts at the collectors of transistors 154 and 156, the transistors have an emitter follower function so grounding base 154*b* substantially grounds emitter 144*e* and lead 84**.

Turning to FIG. 3, when a voltage is applied to both the set and reset pins 162 and 164 of a JK flip flop, a pulse at the CP pin 166 has no affect on the state of the flip flop. When the set and reset pins are grounded, a pulse at the CP pin toggles the flip flop. Thus, under normal conditions, the voltage applied through resistor 174 maintains set and reset pins **162*a* and 164*a* at a relatively high voltage so any pulses or noise inadvertently fed through lead 78 will not change the state of flip flop 160*a*. When rotation of the tuning knob grounds the base of either transistor 154 or 156, however, the emitter-follower action of the transistor grounds lead 82 or 84. Pins 162*a* and 164*a* then are grounded through diode 178 or 180 and each pulse at CP pins 166*b*, 166*c***, etc., toggles the appropriate flip flop.

NAND gates 190 and 196 produce a positive output pulse when both inputs become grounded. Leads 82 and 84 normally are positive and taking NAND gates **190*a* and 196*a* as examples, leads 188*a* and 194*a* normally are positive by virtue of the voltage at point 202*a*. When the tuning knob is turned in the direction moving pole 144 into touch with contact 148, lead 82, which is one input to NAND gate 190*a*, is grounded. Assuming that the voltage at pin 168*a* is high so flip flop 160*a* is storing a one (i.e., the set state), the next pulse in line 78 toggles the flip flop, which reduces the voltage at pin 168*a* to ground and raises the voltage of pin 170*a* so the flip flop now stores a zero (the reset state). As the voltge on pin 168*a* drops, a negative pulse is produced in lead 188*a*. This negative pulse drags the second input of NAND gate 190*a* to ground and the NAND gate then produces a positive pulse that passes through resistor 204*a* to CP pin 166*b***.

If flip flop **160*b* is in the set state when this pulse reaches pin 166*b*, the pulse changes the state of flip flop 160*b* to the reset state and NAND gate 190*b* produces a positive pulse at CP pin 166*c*. If flip flop 160*b* is in the reset state when the pulse reaches pin 166*b*, however, changing pin 168*b* to a positive voltage produces a positive pulse in lead 188*b*. Because lead 188*b* does not become grounded momentarily NAND gate 190*b* does not produce a positive pulse. Furthermore, as pin 170*b* loses its positive voltage, a negative pulse is produced in lead 194*b* but because the other input to NAND gate 196*b* (i.e., lead 84) is not grounded, NAND gate 196*b* does not produce a positive output pulse. The same of course is true for flip flop 160*a*, so when lead 82 is grounded and flip flop 160*a* is reset, the next pulse on pin 166*a* toggles flip flop 160*a*** but does not change the states of the other flip flops.

Conversely, when lead 84 is grounded (through pole 142) and flip flop **160*a* is reset, the next pulse on CP pin 166*a* toggles flip flop 166*a* and NAND gate 196*a* passes a pulse to CP pin 166*b*; when the flip flop is set, the next pulse toggles flip flop 160*a* only. Thus the series of flip flops 160 and gates 190 and 196 provide a binary counting function in which flip flop 160*a* stores the first binary digit, flip flop 160*b* stores the second, 160*c* the third, etc. Applying a pulse to pin 166*a* and grounding lead 82 increases the binary number stored in the flip flops while applying the pulse and grounding lead 84** decreases the binary number.

When pin **170*a* is at a high voltage (i.e., flip flop 160*a* is in the reset state or stores a zero), lead 208*a* transmits the voltage into amplifier-inverter 226*a* which produces a negative voltage at the base of transistor 228*a*. This turns off transistor 228*a* and stops the current flowing from point 71 through coils 70*a*, 68*a*, 66*a*, windings 282*a* and lead 98*a* (see FIG. 5). The lack of current in coils 66*a*, 68*a*, and 70*a* opens the contacts of the associated reed relays and switches capacitors 22*a*, 42*a*, and 62*a* out of the appropriate tank circuits. When pin 170*a* is at a low voltage (i.e., flip flop 160*a* is in the set state or stores a one), a similar analysis shows that transistor 228*a* is turned on and the associated switches of the reed relays are closed so capacitors 22*a*, 42*a*, and 62*a*** are switched into the appropriate tank circuit. Thus, each flip flop controls the coupling of a set of incremental capacitors into and out of the tank circuits and the radio is tuned to various carrier frequencies by adding or subtracting pulses from the flip flops.

Now assume the radio operator desires to set push button **102*v* to the tuned station so subsequent actuation of push button 102*v* will tune the radio to that station. To accomplish this, the radio operator first pushes preset button 86 which moves pole 264 to contact 262. This grounds lead 90, the output from amplifier 258, and also leaves lead 92 floating (see FIG. 5). Grounding lead 90 prevents any output of the preset amplifier from reaching the flip flops and floating lead 92 prevents any operation of transistors 210. Then the operator presses push button 102*v* which moves pole 240*v* into touch with contact 246*v*. Pole 240*v* connects the voltage source at point 242 to lead 104*v* and the resulting current in lead 104*v* charges capacitor 304*v*. While charging capacitor 304*v*, the current in lead 104*v*** switches all cores in the *v* row (i.e., **94*av*, 94*bv*, 94*cv***, etc.) into the same state.

Then the operator releases push button **102*v*. After pole 240*v* leaves contact 246*v*, capacitor 304*v* discharges through cores 94*av* . . . 94*kv* and resistor 306*v*. This discharge current is selected so it equals one half of the amount necessary to switch the cores. Those flip flops storing a one (i.e., the $\overline{Q}$ pin 170 is low) have their associated transistors 228 turned on as described above to produce a current in associated leads 98. The components are designed so the current in lead 98 equals one half of the amount needed to change the state of a memory core. (Resistors 300 are used to adjust the current in leads 98 to the appropriate values.) These two currents add together to change the state of the cores associated with flip flops containing a one; cores associated with flip flops containing a zero receive only one half the amount of current required to change their state and therefore do not make the change. Thus the cores associated with push button 102*v*** now contain the tuning data of the tuned station.

The radio operator can tune to other stations by turning knob 72 in one direction to move up the radio scale and in the other direction to move down the scale without affecting the states of the memory cores, for the current in windings 282 never reaches the amount required to switch a core. A slight pressure on the knob acts through the pressure sensitive resistors 136, 138 to produce pulses at a low rate (i.e., 1–2 pulses per second) while a higher pressure results in a higher pulse production rate. The pulses change the states of the binary counters and thereby change the amounts of incremental capacitance in the tank circuits as described above.

Now assume the radio is tuned to another station and the radio operator wants to tune to the station stored under push button **102*v*. To do this, the circuitry first clears the flip flops and then sets each flip flop to the state stored in the appropriate memory core. The operator accomplishes these steps by merely pressing push button 102*v*. While all of poles 240 are in touch with their associated contact 244, the voltage at point 242 is applied to the base of transistor 250 where it reverse biases transistor 250. When pole 240*v* moves away from contact 244*v*, transistor 250 turns on and the coupling provided by capacitor 256 produces a negative pulse at the input of amplifier 258. Amplifier 258 inverts the negative pulse into a positive pulse in line 90 which applies the positive pulse to each preset pin 172. This pulse at the preset pins switches all of the flip flops to the reset state where the voltage at $\overline{Q}$ pin 170 is high. Each of transistors 228 then is reverse biased, which switches each of the incremental capacitors out of its appropriate tank circuit. Thus moving a pole 240 away from its contact 244** clears the tank circuits of incremental capacitance.

When pole 240*v* strikes contact 246 *v*, it charges capacitor 304*v* as described above and brings all memory cores 94*av*, 94*bv*, 94*cv*, etc., to the same orientation. The cores previously in the opposite orientation, however, contain a flux as they are switched while the cores already in that orientation produce no flux output. The flux produces a current in the read winding 280 of the appropriate core, and this current is applied to the base of the appropriate transistor 222, thereby turning off the transistor. As transistor 222 turns off, the associated capacitor 214 transmits a positive pulse to the base of transistor 210. The positive pulse turns on transistor 210 which then grounds its associated $\overline{Q}$ pin 170 through lead 208, lead 92 and pole 264. This changes the state of the associated flip flop so the flip flop now is in the set state and corresponds to the state stored in its associated memory core before the push button was actuated. Since pin 170 of the changed flip flops now is at a low voltage, its associated transistor 228 turns on and closes the appropriate reed relays to switch the proper amounts of incremental capacitance into the tank circuits. The radio now is tuned to the station previously set into the part of the memory associated with push button 102*v*.

The operator then releases push button 102*v* and after pole 240*v* leaves contact 246, capacitor 304*v* discharges through windings 284*av*, 284*bv*, etc., and resistor 306*v* as described above. Again the discharging capacitor produces one half of the amount of current required to switch the core and this half current combines with the half current existing in the windings 282 associated with those flip flops in the state to switch the associated core into an orientation representing the state of its flip flop. Thus the cores return to the previously stored states.

In a similar manner, the cores associated with the other push buttons are set to any desired stations. Any row of cores can be cleared of a previously stored station and set to a new station, which must be the station presently tuned on the radio, by actuating the preset button 86 and then the appropriate push button 102. Lead 90 is grounded to prevent presetting the flip flops, and lead 92 is floating to prevent the flux in certain cores from changing the states of the associated flip flops. As the pole 240 touches the contact 246, the current charging the capacitor 304 erases the sense previously existing in the memory cores. After pole 240 moves away from the contact 246, the cores are switched to the states of the associated flip flop by the half current mechanism described above.

Values of each group of incremental capacitors are selected according to the binary numbering system so capacitor 22*a* equals 1 unit, capacitor 22*b* equals 2 units, capacitor 22*c* equals 4 units, capacitor 22*d* equals 8 units . . . capacitor 22*k* equals 1024 units. The band width of AM broadcasting carrier frequencies is about 10 kHz., and the eleven incremental capacitors divide the radio band into enough segments to provide proper tuning. Larger or smaller numbers of incremental capacitors can be used to produce the desired accuracy.

FIGS. 6 AND 7

Figure 6:
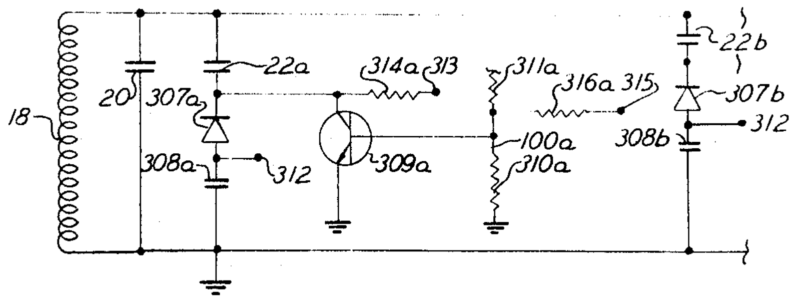
FIG. 6 shows electronic circuitry that can be used to replace the reed relays in FIGS. 1–5.

Reed relays 66, 68 and 70 can be replaced by a switching circuit constructed according to FIG. 6. The FIG. 6 circuit is integrable and does not significantly degrade the Q of the tank circuit.

FIG. 6 shows the inductor 18 and capacitor 20 of tunable tank circuit 16 (FIG. 1) in parallel with incremental capacitors 22*a* and 22*b* of its 11 incremental capacitors. Capacitor 22*a* is in series with a diode 307*a* and another capacitor 308*a*, with capacitor 22*a* connected to the cathode of the diode and the anode of the diode connected to capacitor 308*a*. The cathode of the diode is connected to the collector of an NPN transistor 309*a* which has its emitter connected to ground and its base connected to lead 100*a*.

A resistor 310*a* connects lead 100*a* to ground and a resistor 311*a* connects lead 100*a* to the undotted terminal of winding 282*az* (FIG. 4). A voltage source 312 is connected to the anode of diode 307*a*, a voltage source 313 is connected through a resistor 314*a* to the collector of transistor 309*a*, and a voltage source 315 is connected through a resistor 316*a* to lead 100*a*. Similar constructions are used with the other incremental capacitors.

When pin 170*a* of flip flop 160*a* is at a high voltage, transistor 228*a* is reverse biased and a relatively high voltage appears at the top of resistor 310*a*. Transistor 309*a* is forward biased thereby and drops the voltage of the anode of diode 307*a*. Diode 307*a* then is forward biased also and presents a small impedance to ground for alternating current on capacitor 22*a*. Capacitor 22*a* then is effectively coupled into the tank circuit and changes the resonant frequency thereof.

When pin 170*a* is at a low voltage, transistor 228*a* is forward biased and a low voltage appears at the top of resistor 310*a*. Transistor 309*a* and diode 307*a* then are reverse biased and the diode represents a high impedance in series with capacitor 22*a*, thereby effectively decoupling capacitor 22*a* from the tank circuit. Note that the FIG. 6 circuit couples the capacitor into the tank circuit when the flip flop stores a zero, which is the reverse of the FIG. 5 circuit. This arrangement maintains the Q of the tank circuit of FIG. 6 at a low value.

Figure 7:
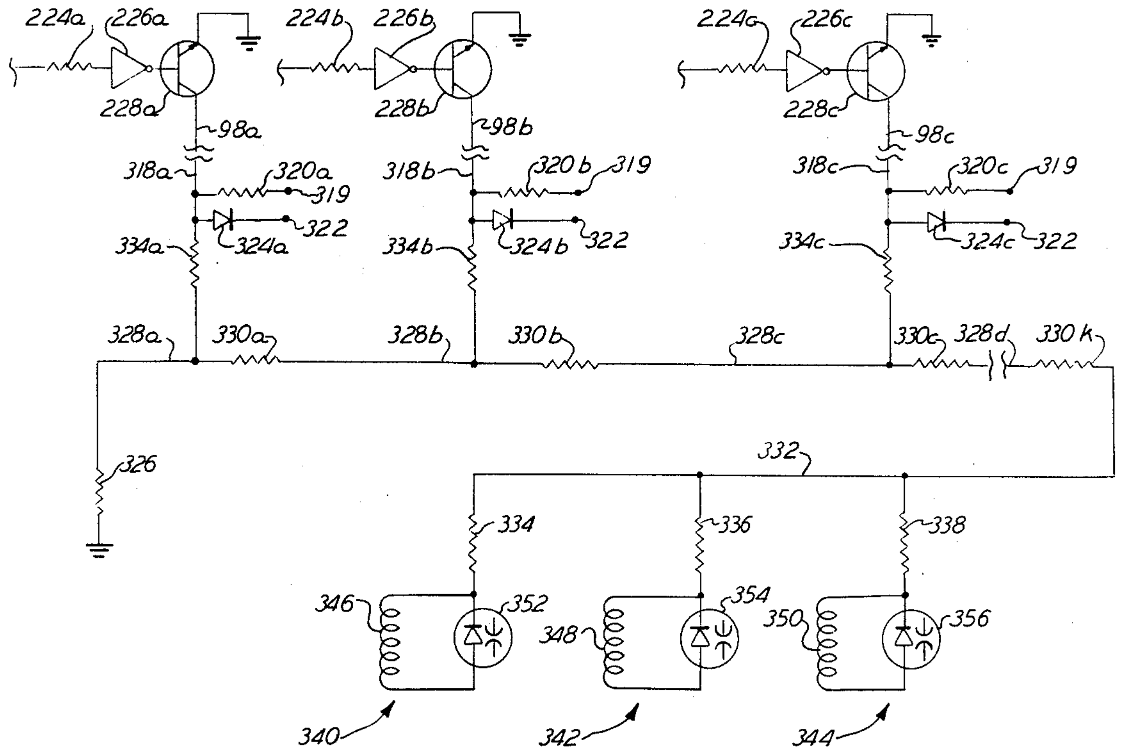
FIG. 7 shows another circuit for replacing the reed relays in which a resistance ladder converts the binary sense of the counters into analog sense and hyper-abrupt junction diodes responsive to the analog sense serve as the variable reactance to change the resonant frequency of tank circuits.

FIG. 7 shows a digital-analog conversion circuit that permits replacing the incremental capacitors with continuously variable devices for changing resonant frequencies. Referring to FIG. 7, resistors 224 are connected through inverters 226 to transistors 228, and leads 98 are connected to the dotted terminals of windings 282*av*, *ax*, etc., as described above (see FIG. 5). Leads 318*a*, *b*, *c* . . . *k* are connected to the undotted terminals of windings 282*az*, *bz*, etc. A voltage source 319 is connected to leads 318*a*, *b*, *c* . . . *k* through resistors 320*a*, *b*, *c* . . . *k*. Another voltage source 322 is connected to leads 318*a*, *b*, *c* . . . *k* through diodes 324*a*, *b*, *c* . . . *k* with the cathodes of the diodes connected to the voltage source.

A resistor 326 connects a lead 328*a* to ground, and lead 328*a* is connected to a resistor 330*a*. A lead 328*b* connects resistor 330*a* with a resistor 330*b*, a lead 328*c* connects resistor 330*b* with a resistor 330*c*, etc. Resistor 330*k* is connected to a lead 332. Resistors 334*a*, *b*, *c* . . . *k* connects leads 318*a*, *b*, *c* . . . *k* to leads 328*a*, *b*, *c* . . . *k*, respectively.

Lead 332 is connected through respective resistors 334, 336, and 338 to three tunable tank circuits 340, 342 and 344. Each tank circuit comprises an inductor 346, 348, 350 in parallel with a hyper-abrupt junction diode 352, 354, 356.

Typical types and values of the components in FIG. 7 with 12 volts at point 299 and 10 volts at point 322 are resistors 320, 5K; resistors 326 and 334, 12K; resistors 330, 6K; resistors 334, 336 and 338, 100K; and junction diodes 352, 354 and 356, Motorola Epicap MV1401.

FIG. 7 operation converts the digital sense of the binary counters into analog sense appearing at lead 332 through the resistance ladder made up of leads 328 and resistors 330. When pin 170*a* of flip flop 160*a* is at a high voltage, transistor 228*a* is turned off. Diode 324*a* clamps lead 318*a* at a potential slightly higher than the potential of point 322. In the circuit shown, this potential is about 10.7 volts. An increment of this potential appears in lead 328*a* and a portion of the increment is transmitted through resistor 330*a*, lead 328*b*, resistors 330*b*, lead 328*c*, etc., to lead 332 and finally through resistors 334, 336 and 338 to junction diodes 352, 354 and 356.

By similar analysis, when pin 170*b* is at a high voltage, an increment of voltage appears in lead 328*b* which adds to the voltage in lead 328*a* and the same is true for the remaining flip flops. On the other hand, if pin 170*a* is at a low voltage, transistor 228*a* is forward biased, lead 318 is at a low potential, and no voltage increment is produced in lead 328*a*. Thus the voltage ultimately appearing in lead 332 is analogous to the states of the flip flops.

The voltage in lead 332 varies the reverse bias on junction diodes 352, 354 and 356, and the junction diodes show a decrease in capacitance with an increase in reverse bias. This decreased capacitance increases the resonant frequency of the tunable circuits accordingly and thus the resonant frequencies of the tunable circuits 340, 342 and 344 are proportional to the voltage in lead 332.

A DC coupling arrangement can be used between the flip flops instead of the AC coupling shown. Such DC couplings are more easily produced in integrated circuit form and are less susceptible to spurious noise. The pulse generator and pulse counters can be used with any variable reactance in the tank circuit and without the memory circuit if desired. Definite tuning analogous to the crystal tuning systems widely used in aircraft and CB equipment is achieved by the incremental capacitors, while in FIGS. 6 and 7 circuits are more analogous to the continuous tuning systems found in ordinary AM radios. Where a memory system is desired, any of a variety of memories can be used in place of the magnetic core memory.

Thus this invention provides a tuning device for rapidly and accurately changing the resonant frequency of a resonant circuit. The tuning device can be used in any of a wide variety of receiving or transmitting equipment and can be miniaturized along with the other electronic components of the equipment.

What is claimed is:

1. In a mechanism used in the transmission of electromagnetic carrier waves of varying frequencies having a resonant circuit for tuning said mechanism to a carrier wave frequency, a tuning device comprising:

variable reactance means for changing the resonant frequency of said resonant circuit, pulse counting means for varying the reactance of said variable reactance means, pulse generating means coupled to said pulse counting means, a manually operable means connected to said pulse generating means for starting and stopping pulse generation, the pulses being applied to said pulse counting means, said pulse counting means varying the reactance of said variable reactance means to change the resonant frequency of the resonant circuit according to the pulses counted, and a storage means for storing the number of pulses counted by the pulse counting means from a predetermined reference point and a manually operated mechanism for resetting the pulse counting means with the data stored in the storage means to change the resonant frequency of said resonant circuit.

2. The mechanism of claim 1 in which the variable reactance means comprises a plurality of incremental capacitance means.

3. The mechanism of claim 1 in which the variable reactance means comprises a junction diode.

4. The mechanism of claim 1 in which the pulse counting means comprises a plurality of binary counters and the variable reactance means comprises a plurality of switches with each of said counters coupled to one of said switches so the condition of each counter is reflected by the switch coupled thereto.

5. The mechanism of claim 4 in which the storage means comprises a switchable magnetic storage element, a first winding on said storage element coupling one of said switches with the corresponding binary counter, a second winding on said storage element, said second winding having one side coupled to a capacitor, a manually actuated switch pole for coupling a voltage source to the other side of said second winding, means for passing current approximately equaling one half of the amount of current needed to change the state of said storage element through said first winding when said corresponding binary counter is in the state for closing said switch, and means for discharging said capacitor through said second winding with a current approximately equaling one half of the current needed to change the state of the storage element when the switch pole decouples the voltage source from the second winding, the currents in said first and second windings adding together to change the state of the storage element.

6. The mechanism of claim 5 comprising a third winding on said storage element, and a manually actuated preset switch for coupling said third winding to a means for presetting said binary counter, said storage element inducing a presetting current in said third winding when the storage element changes its state as a result of said switch pole coupling the voltage source to the second winding.

7. The mechanism of claim 6 in which the manually operable means for starting and stopping pulse generation comprises a pressure sensitive resistor, circuit means containing said resistor for generating pulses according to the pressure on said pressure sensitive resistor, and a switch means spring loaded to a neutral position and manually movable to apply pressure to said pressure sensitive resistor.

8. The mechanism of claim 1 in which the pulse counting means comprises a plurality of binary counters, said mechanism comprising means for converting the digital sense of said binary counters into analog sense representative of said digital sense, and means for varying the variable reactance means according to said analog sense.

9. The mechanism of claim 8 in which the digital to analog converting means comprises a resistance ladder and the variable reactance means comprises a junction diode.

10. A tuning device for a resonant circuit comprising:

pulse generating means, pulse counting means for counting the pulses of said pulse generating means, variable reactance means in said resonant circuit, circuit means coupling said pulse counting means to said variable reactance means, said variable reactance means changing the resonant frequency of said resonant circuit according to the state of said pulse counting means, and memory means for storing the state of said pulse counting means and circuitry for restoring the pulse counting means to the state of said memory means, said restoring circuitry comprising means for clearing the pulse counting means and means for transmitting the stored state from the memory means to the pulse counting means to restore the pulse counting means to the state stored in the memory means.

11. The tuning device of claim 10 in which the pulse counting means comprises a plurality of binary counters.

12. The tuning device of claim 11 in which the circuit means comprises a resistance ladder means for converting the binary sense of the pulse counter means into analog sense representative of the states of said binary counters, and the variable reactance means comprises means responsive to said analog sense for changing the resonant frequency of said resonant circuit.

13. The tuning device of claim 12 comprising manually actuated switch means movable from a rest position to a set position, said switch means activating the means for clearing the binary counters when leaving the rest position and activating the means for transmitting the stored states from the memory means to the binary counters when reaching the set position.

References Cited

UNITED STATES PATENTS

| | | | |
|---|---|---|---|
| 2,976,411 | 3/1961 | Kahn | 331—18 X |
| 3,259,851 | 7/1966 | Brauer | 331—25 X |
| 3,293,572 | 12/1966 | Smith | 331—36 X |
| 3,376,517 | 4/1968 | Reynolds | 331—18 |
| 3,401,353 | 9/1968 | Hughes | 331—18 X |

HERMAN KARL SAALBACH, Primary Examiner

PAUL L. GENSLER, Assistant Examiner

U.S. Cl. X.R.

334—11, 15, 55; 331—179, 177; 325—465